(12) United States Patent
Haze et al.

(10) Patent No.: US 10,942,980 B2
(45) Date of Patent: Mar. 9, 2021

(54) REAL-TIME MATCHING OF USERS AND APPLICATIONS

(71) Applicant: SAP SE, Walldorf (DE)

(72) Inventors: Oren Haze, Kfar Saba (IL); Roni Ramon-Gonen, Herzliya (IL); Eran Lavi, Ra'anana (IL)

(73) Assignee: SAP SE, Walldorf (DE)

( * ) Notice: Subject to any disclaimer, the term of this patent is extended or adjusted under 35 U.S.C. 154(b) by 193 days.

(21) Appl. No.: 16/126,118

(22) Filed: Sep. 10, 2018

(65) Prior Publication Data

US 2020/0082021 A1  Mar. 12, 2020

(51) Int. Cl.
*G06F 16/9535* (2019.01)
*G06Q 20/24* (2012.01)
*G06F 16/248* (2019.01)

(52) U.S. Cl.
CPC ........ *G06F 16/9535* (2019.01); *G06F 16/248* (2019.01); *G06Q 20/24* (2013.01)

(58) Field of Classification Search
CPC ...... G06F 9/5055; G06F 8/70; G06F 16/9535; H04L 67/34; H04L 51/14; G01P 15/02; G06Q 50/10; G06Q 10/06; A61B 5/0482
See application file for complete search history.

(56) References Cited

U.S. PATENT DOCUMENTS

| | | | |
|---|---|---|---|
| 7,107,204 B1 | 9/2006 | Liu et al. | |
| 9,132,349 B2 | 9/2015 | Haze et al. | |
| 9,418,060 B1 | 8/2016 | Winham et al. | |
| 2003/0106058 A1 | 6/2003 | Zimmerman et al. | |
| 2008/0139112 A1 | 6/2008 | Sampath et al. | |
| 2011/0209143 A1* | 8/2011 | Ierullo | G06Q 10/06 717/176 |
| 2011/0264522 A1 | 10/2011 | Chan et al. | |
| 2011/0264650 A1* | 10/2011 | Tobin | G06F 16/248 707/722 |
| 2011/0282669 A1 | 11/2011 | Michaelis | |
| 2012/0110565 A1* | 5/2012 | O'Sullivan | G06F 8/70 717/174 |
| 2012/0117015 A1 | 5/2012 | Sathish | |
| 2012/0173729 A1* | 7/2012 | Lee | G06F 9/5055 709/226 |
| 2012/0303561 A1 | 11/2012 | Sathish | |
| 2013/0262641 A1* | 10/2013 | Zur | G06Q 10/10 709/223 |
| 2014/0012924 A1* | 1/2014 | Jagernauth | G06Q 50/10 709/206 |
| 2014/0195297 A1 | 7/2014 | Abuelsaad et al. | |

(Continued)

OTHER PUBLICATIONS

U.S. Appl. No. 16/113,770, filed Aug. 27, 2017, Ramon-Gonen et al.

(Continued)

*Primary Examiner* — Etienne P Leroux
(74) *Attorney, Agent, or Firm* — Fish & Richardson P.C.

(57) ABSTRACT

User information for a particular user is accessed. Application information for applications that are available in an organization of the particular user is accessed. One or more pattern matches between the user information and the application information are determined. One or more application recommendations are generated based on the determined one or more pattern matches. The one or more application recommendations are provided.

19 Claims, 10 Drawing Sheets

(56) References Cited

U.S. PATENT DOCUMENTS

| | | | |
|---|---|---|---|
| 2014/0244617 A1 | 8/2014 | Rose | |
| 2015/0347912 A1* | 12/2015 | Rodzevski | G01P 15/02 |
| | | | 706/11 |
| 2015/0351655 A1* | 12/2015 | Coleman | A61B 5/0482 |
| | | | 600/301 |
| 2016/0188671 A1* | 6/2016 | Gupta | H04L 51/14 |
| | | | 707/722 |
| 2017/0186338 A1 | 6/2017 | Treves et al. | |
| 2017/0270432 A1 | 9/2017 | Sachdev et al. | |
| 2017/0353603 A1* | 12/2017 | Grunewald | H04L 67/34 |
| 2018/0075513 A1 | 3/2018 | Bastide et al. | |
| 2018/0145998 A1 | 5/2018 | Shaikh et al. | |
| 2018/0260914 A1* | 9/2018 | Kemp | G06F 16/22 |
| 2020/0082307 A1 | 3/2020 | Haze | |
| 2020/0082815 A1 | 3/2020 | Haze et al. | |

OTHER PUBLICATIONS

Non-Final Office Action issued in U.S. Appl. No. 16/126,146 dated Jun. 18, 2020, 26 pages.
Non-Final Office Action issued in U.S. Appl. No. 16/126,144 dated Jul. 13, 2020, 33 pages.

* cited by examiner

REAL-TIME MATCHING OF USERS AND APPLICATIONS

CROSS-REFERENCE TO RELATED APPLICATIONS

This application is a co-pending application of, and filed in conjunction with, U.S. patent application Ser. No. 16/126,146, filed on Sep. 10, 2018, entitled "RECOMMENDATIONS AND FRAUD DETECTION BASED ON DETERMINATION OF THE USER'S NATIVE LANGUAGE", and U.S. patent application Ser. No. 16/126,144, filed on Sep. 10, 2018, entitled "REAL TIME MATCHING OF USERS TO ENTERPRISE INTERFACES AND ARTIFACTS"; the entire contents of each which are incorporated herein by reference.

BACKGROUND

Applications can be used by users (for example, in an organization) to perform various functions, such as measuring productivity or recommending an application to increase user productivity. Some software applications can be designed or personalized for a certain type of organization or user. Other applications can be used by users across different types of organizations. An organization can write a custom application in-house or can purchase an application from a software vendor.

SUMMARY

The present disclosure describes real-time matching of users and applications.

In an implementation, user information for a particular user is accessed. Application information for applications that are available in an organization of the particular user is accessed. One or more pattern matches between the user information and the application information are determined. One or more application recommendations are generated based on the determined one or more pattern matches. The one or more application recommendations are provided.

The described subject matter can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented to realize one or more of the following advantages. First, a recommendation engine can perform real-time identification, recommendation, optimization, personalization, and suggestion of ways of using applications. Second, a recommendation engine can identify missing application functionality, by examining user behavior, and recommend implementation of the identified missing functionality. Third, a recommendation system can create real-time and personalized recommendations for specific industries, verticals, or lines of business. Fourth, a knowledge base of user and application information can be created, enabling application recommendation and, additionally, analysis of user application usage, and user/application landscapes. Fifth, a recommendation system can self-learn and improve recommendations over time. Sixth, a recommendation system can generate, based on a current context and knowledge base state for each respective request and based on dynamic user-information and dynamic application-information knowledge bases, specific recommendations for a large number of disparate users. Seventh, generated recommendations can be used in payments for applications or other data instead of the conventional usage/transaction payment model associated with organizations or licensing.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

FIGS. 5-9 illustrate examples of user interfaces in which a generated application recommendation is presented, according to an implementation of the present disclosure.

Like reference numbers and designations in the various drawings indicate like elements.

DETAILED DESCRIPTION

The following detailed description describes real-time matching of users and applications, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

Figure 1:
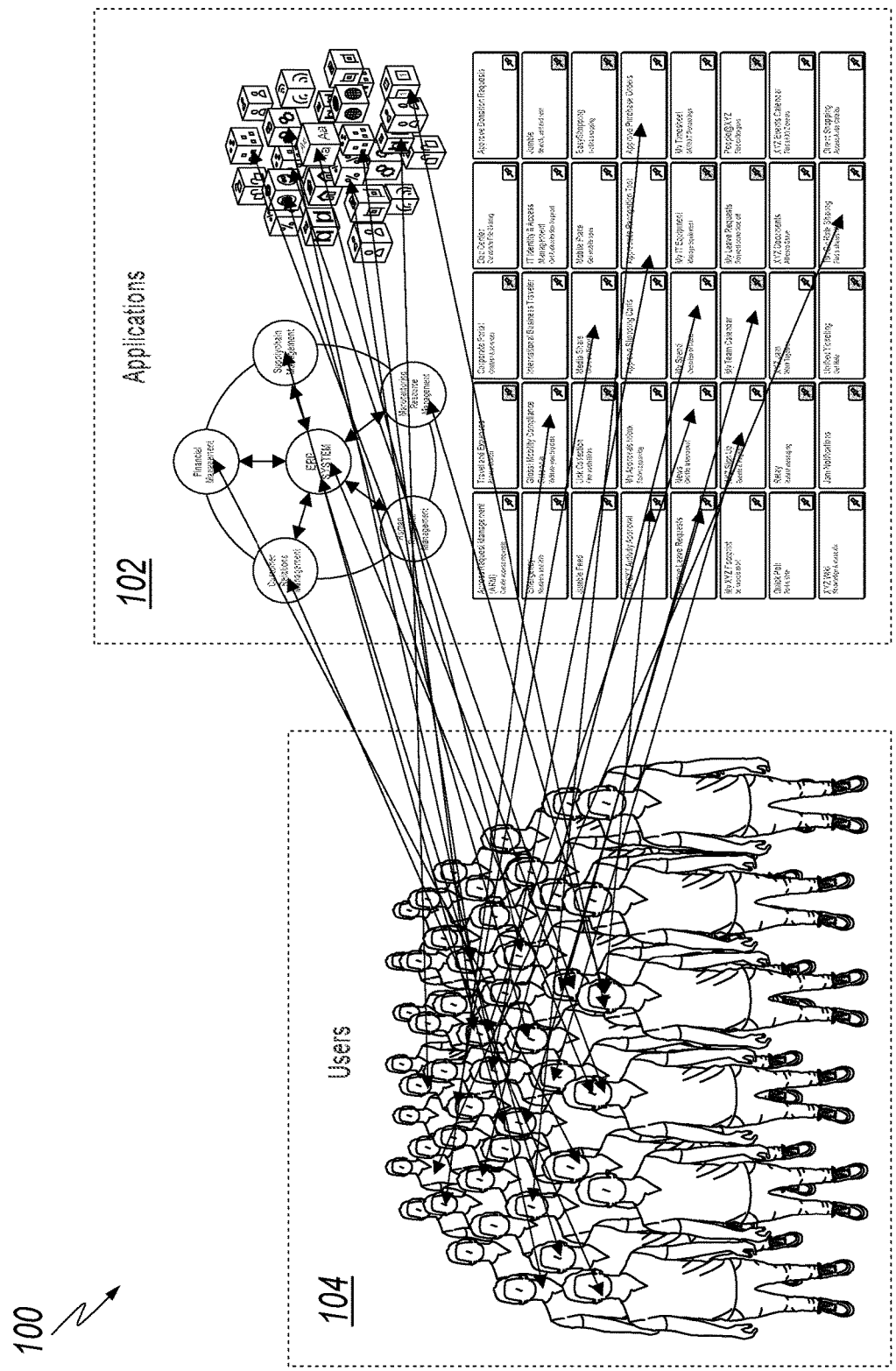
FIG. 1 is a high-level block diagram illustrating an example of a prior art computing system in which applications are not recommended, according to an implementation of the present disclosure.

FIG. 1 is a high-level block diagram illustrating an example of a prior art computing system 100 in which applications are not recommended, according to an implementation of the present disclosure. An application landscape 102 for a large organization can be complex. A large organization may use thousands of different applications in the application landscape 102. For example, the organization may use applications from one or more enterprise software vendors. In some implementations, the applications can come from multiple backend computing systems or computing platforms. In some implementations, the applications can include business intelligence, customer relationship management, human resource management, enterprise resource management, business management, business to business (B2B), content management, manufacturing resource management, financial management, e-commerce, and supply chain management software. Many enterprise applications can be complex, with complex functionality that may require prerequisite knowledge or training for effective use.

The application landscape 102 in an organization can be frequently changing, where new applications can be added on a routine basis as existing applications become obsolete and are retired or deprecated. In-use applications can also change, where functionality for an application can be added, changed, or removed, perhaps on-the-fly. A change in application functionality can result in a change in prerequisite knowledge or training needed for effective application use.

A user landscape 104 in a large organization can also be complex. New users can be added to an organization upon being hired. A given user's role within the organization can change. For example, a user can have a change in job function, a change in department, or a change in relationships with other coworkers. A user's application preferences can also change. A user continues, over time, to build upon an application usage and application-related training history.

In a given organization, there may be a major lack of knowledge and efficiency when a user needs to decide when and what application(s) to use. Unplanned, unsophisticated, rushed, or random application choosing may be inefficient and sometimes may even cause damage to an organization itself, such as due to revenue loss, fines, brand damage, or legal implications).

It can be challenging for a user to keep up-to-date regarding the latest and current applications that are available-/applicable to the user's needs. Frequent application changes and a large number of available applications can dramatically challenge users on a day-to-day basis. An end user may not know which applications are available and which set of applications best suits the user's needs, at a given point in time and in a given context. The user can be unaware that a given application exists, since it may be difficult to locate an application. To solve the previously described challenges, a recommendation system can be used for real-time matching of users and applications. The recommendation system can recommend applications that can increase productivity, allow users to be more efficient, and to satisfy and provide awareness of deadlines and important responsibilities.

Figure 2:
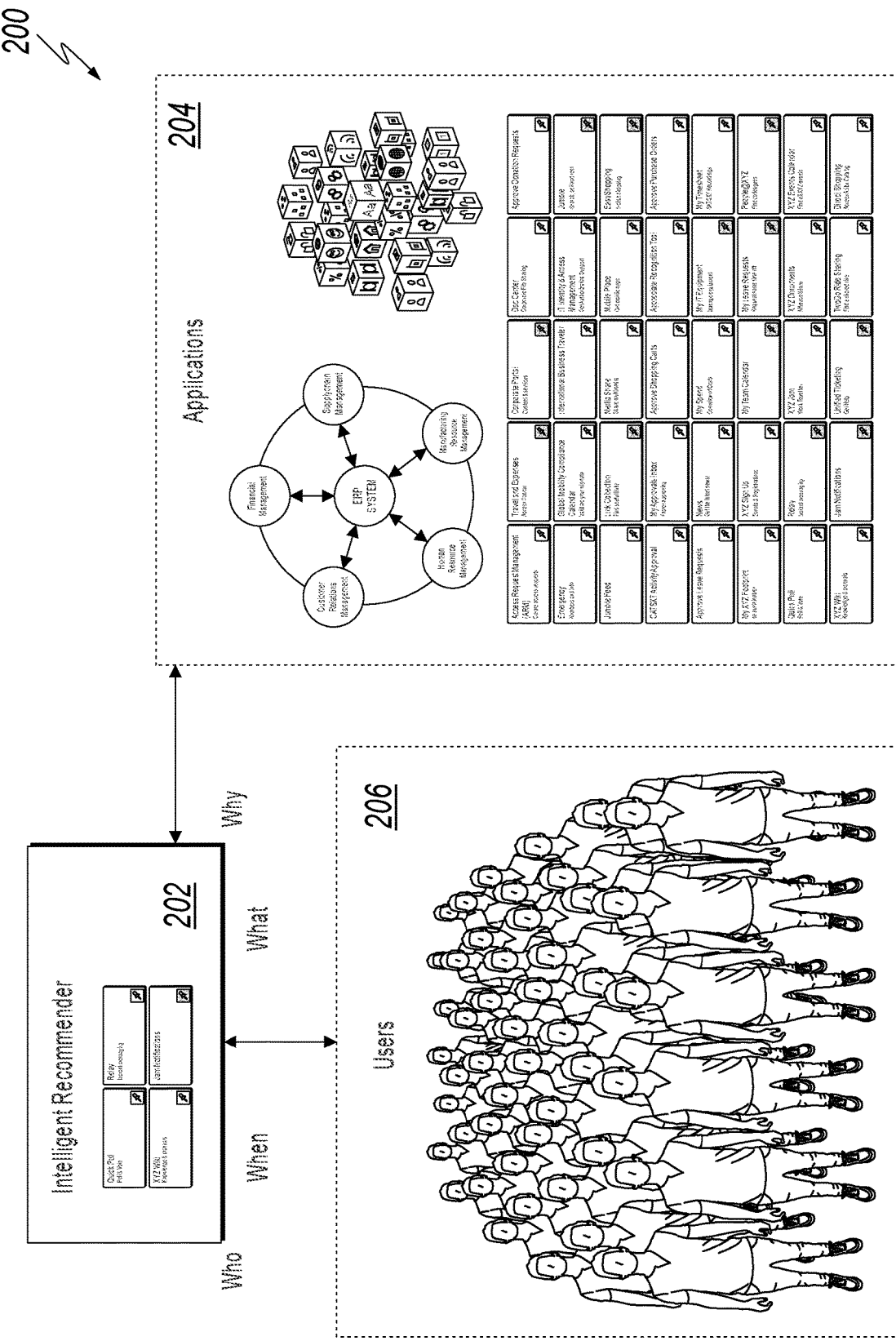
FIG. 2 is a high-level block diagram illustrating an example of a computing system in which an intelligent recommender recommends applications to users, according to an implementation of the present disclosure.

FIG. 2 is a high-level block diagram illustrating an example of a computing system 200 in which an intelligent recommender 202 recommends applications to users, according to an implementation of the present disclosure. The intelligent recommender 202 can recommend specific applications 204 to particular users 206 according to a respective user's current context and historical data, by performing real-time, personalized, intelligent matching between the users 206 and the applications 204. The intelligent recommender 202 can make recommendations based on algorithms that are configured to recommend a right application, to the right user, at the right time and place (that is, "who", "when", "what", "why" recommendations). Even though user and application information is frequently changing, the intelligent recommender 202 can perform, at a given point-in-time, automatic matching of users 206 to applications 204 in a given context, such as a given user's location and current information retrieved at the given point in time.

In some implementations, generated recommendations can be used in payments for applications or other data instead of the conventional usage/transaction payment model associated with organizations or licensing. For example, a new payment model can leveraged permitting "pay by accepted recommendations" (or similar). In these cases, if a recommendation is followed and an application is obtained or updated, payments can be automatically assessed by the recommendation system for the provided recommendation.

Figure 3:
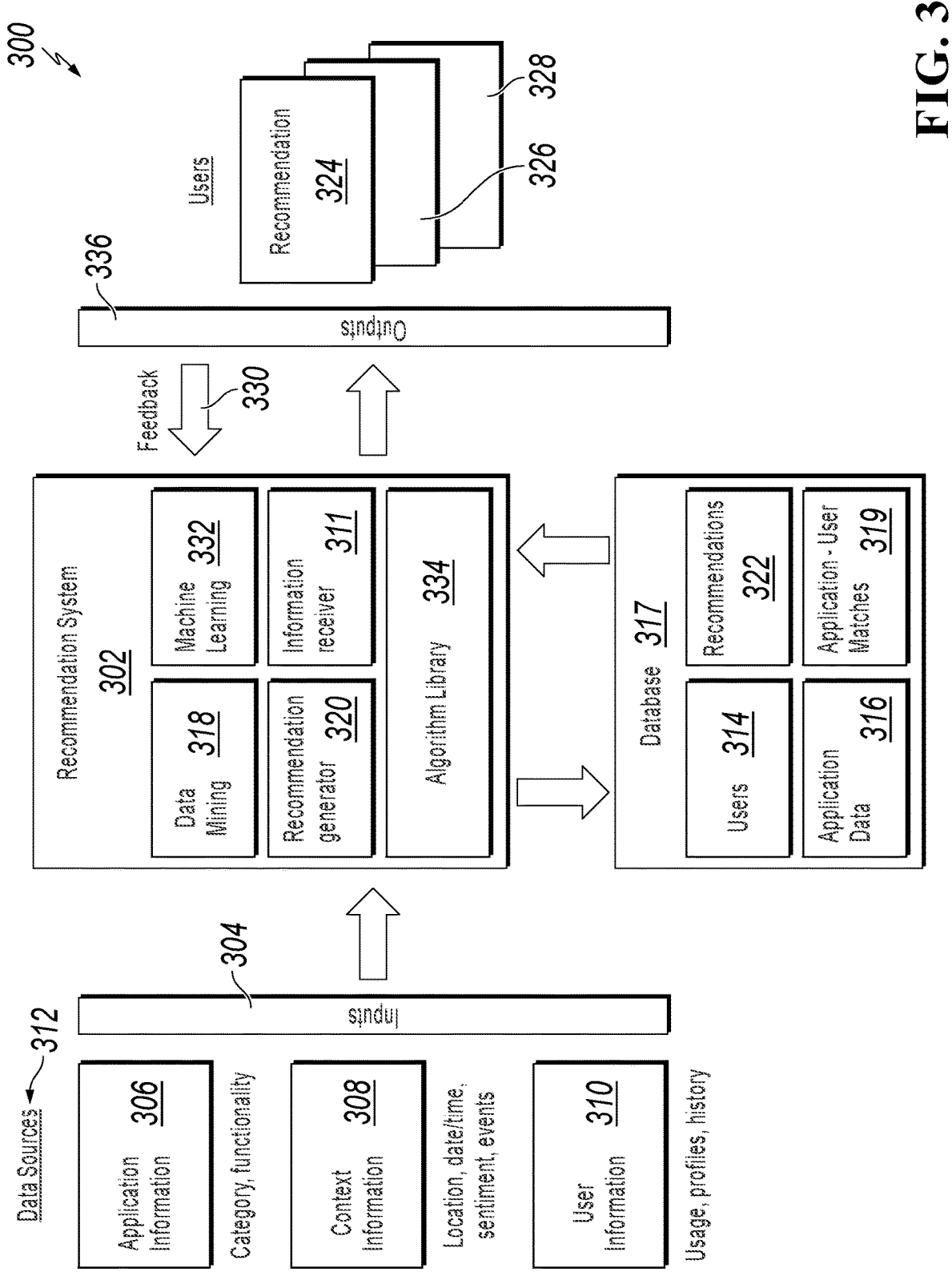
FIG. 3 is a block diagram illustrating an example of a computing system for recommending applications, according to an implementation of the present disclosure.

FIG. 3 is a block diagram illustrating an example of a computing system 300 for recommending applications, according to an implementation of the present disclosure. A recommendation system 302 can obtain a variety of inputs 304. Inputs 304 can include application information 306, context information 308, and user information 310. Some or all of the inputs 304 can be obtained by an information retriever 311. The information retriever 311 can periodically (for example, every minute, hour, or day) request application information 306, context information 308, or user information 310 from a list of known data sources 312. As another example, the information retriever 311 can automatically receive application information 306, context information 308, or user information 310 from the data sources 312. For example, the data sources 312 can be configured to periodically provide application information 306, context information 308, or user information 310. As another example, the data sources 312 can be configured to provide application information 306 or user information 310 when application information 306 or user information 310 change in a data source 312, due to new, changed, or deleted information. In addition to obtaining external application information 306, context information 308, or user information 310, the recommendation system 302 can obtain user information 314 or application data 316 that is stored internally in a database 317 by the recommendation system 302, another system at a same organization as the recommendation system 302.

In some implementations, application information 306 can include application metadata that can include application categories, descriptions, required prerequisite knowledge, required prerequisite training, targeted user role, needed permissions, application pricing, application functionality descriptions, and application options. In some implementations, application information 306 can include other information consistent with this disclosure.

User information 310 can include organizational data, demographic data, application usage and other user activity information, user roles, user profile information, user preferences (for types of applications or user interfaces), or social data, to name some examples. Application usage information can include usage information for some or all applications used by a given user, including application installation and removal, application startup, application feature utilization, and time and length of use information. In some implementations, user information 310 can include data stored for a user in an organization, such as tasks assigned to the user (and completion status), a user's calendar and scheduled events, and a user's relationships to other users (and user information for those other related users). User information 310 received by the recommendation system 302 can be information for which the recommendation system 302 has been permitted to obtain, by a particular user, an organization, or an application owner.

Context information 308 can include context associated with obtained application information 306 or user information 310, such as a date, time, or location of data capture. As another example, context information 308 can represent current information for a user, such as a user's current location, or a current date and time, such as date and time at which next recommendation(s) may be generated. Date or time information can represent particular date or time periods, such as afternoon-time, morning-time, weekday, weekend, a particular season, end-of-quarter, or end-of-year. For example, location information can correspond to a user's work location or home location, a city, a state, or a country.

Other context information 308 can include sentiment information or event information. In some implementations, event information can include a reminder of a due date or a request to complete a task (which may require or benefit from the use of certain applications), or a notification regarding new, changed, or deleted applications that may be now available (or unavailable) to a user. In some implementations, sentiment information can include positive or negative information about a user's use or preference for various applications. In some cases, a user's current or past use of certain applications or types of applications can be viewed as a positive endorsement of those applications. Similarly, a user stopping use of a particular application due to installing and using a replacement application can be viewed as negative sentiment. In some implementations, positive or negative reviews of applications can be included in the sentiment information.

Obtained application information 306 and user information 310 can be stored by the recommendation system 302, as user information 314 or application data 316, respectively. In some implementations, context information 308 that may have been associated with the application information 306 or user information 310 can be stored in the database 317 linked to respective associated data. In some implementations, a data mining component 318 can analyze the user information 314 and application data 316 to determine pattern matches between the user information 314 and the application data 316, for purposes of generating one or more application recommendations for one or more users. In some implementations, a pattern match can be where user information 314 for a user matches application data 316 for an application which the user has not installed or used (or not used within a predetermined time period, such as a prior month).

For example, user information 314 can indicate that a user has assigned but uncompleted tasks. The data mining component 318 can determine one or more applications (which may or may not have been installed yet for the user) that can be used to complete the uncompleted tasks. As another example, user information 314 can indicate that a user performs certain application functionality with one or more applications that have been installed for the user. The data mining component 318 can determine one or more other applications, such as newer applications, that may be able to be used by the user to perform the application functionality in a more efficient manner.

In some implementations, the data mining component 318 can determine applications that are going to be retired or eliminated at a later date. In these cases, the data mining component 318 can identify replacement applications that include the same functionality, or other applications that have been previously identified as replacement applications. In some implementations, replacement application information can be included in a subsequently generated recommendation, to be presented to users who are still using the to-be-retired applications.

Application recommendations can be based on a user's role within an organization. For example, a user in a given role may need to perform certain tasks, have certain type of relationships (such as subordinates), or have access to certain types of applications. Role-specific recommendations can be provided for various roles, such as managers, sales people, employees, or developers. In some implementations, the data mining component 318 can determine user information 314 for users that are similar to a given user. For example, application usage information for users with a same (or similar) role can be identified. The data mining component 318 can identify, for a given user, applications that are used by users similar to the user. User information 314 can include information that applies to a group of similar users or users that have the same or similar characteristics. For example, a particular organization (or sub-organization, such as a department) can have certain defined goals. The data mining component 318 can determine that a given user is included in the particular organization, and match one or more goals of the organization to application(s) that can help achieve such goals.

The data mining component 318 can match applications to users based at least in part on context information associated with the user. For example, user information 314 can include current or recent performance information for computing device(s) used by the user. The data mining component 318 can identify applications that can achieve acceptable performance on the user's current computing devices. The data mining component 318 can also identify applications which could be used by the user if the user upgraded their computing device(s). The data mining component 318 can determine applications that can be used at a current location or site at which the user is currently located.

Determined application-user matches 319 can be stored in the database 317, and used by a recommendation generator 320 to generate one or more application recommendations 322 (which can also be stored in the database 317). In some implementations, a recommendation 322 can include a description of the recommended application and why the application is being recommended to a particular user. Recommendations 322 can be real-time and personalized recommendations for users in specific organizations (for example, to use for specific industries, verticals, or lines-of-business).

Recommendations 322 can be a reminder for a user to use an application which a user has previously used. Recommendations 322 can be for applications which a user has installed, but not used, or an application for which a user has access (that is, permitted to use, able to install). As another example, a recommendation 322 can be for an application for which a user does not currently have access, but for which a user can obtain access (for example, has permission to access). In some implementations, the recommendation 322 can include a description of how the user can obtain access to the recommended application.

Generated recommendations 322 can be presented to user(s) (for example, as presented recommendations 324, 326, and 328). In some implementations, presented recommendations 324, 326, and 328 can include a link or other mechanism that enables the user to install, run, or install and run the recommended application. In some implementations, recommendations 324, 326, and 328 can be presented in different channels, such as in an application finder, an application launch pad/dashboard, email, on various types of user devices, including mobile devices, desktop devices, or other computing devices or messaging platforms. In some implementations, recommendations 324, 326, and 328 for an application can be presented to a user while a user is using a particular, other application, while in a certain location, at a next login time, or upon other scheduling.

The data mining component 318, information retriever 311, and recommendation generator 320 can perform processing at various times and in response to various triggers. In general, processing by the recommendation system 302 can be ongoing, either periodic or event-driven (for example, to account for potentially frequent changes in application information 306 and user information 310). Recommendation system 302 processing can be performed periodically, such as every minute, every hour, every day, or in response to changed data or newly received data. As described previously, a large organization may have many thousands of users and many thousands of applications, resulting in dynamic application information 306 and user information 310 data sets. Without frequent application recommendation generation, users may not be using best-suited applications for their needs or an organization's benefit. In some implementations, recommendation system 302 processing can be performed in batch, such as by periodically obtaining application information 306 and user information 310 for all known applications and users, and automatically generating new recommendations based on a current state of the database 317. As another example, the recommendation system 302 can generate recommendations for particular users based on activities performed by a given user, such as the user logging in, starting a dashboard or other application, or being at a particular location.

After recommendations 324, 326, and 328 are presented, feedback 330 can be provided to the recommendation system 302. Feedback 330 can include, for example, indications of whether recommendations were acted upon, how long to respond, or whether presented recommendations 324, 326, or 328 were dismissed without being acted upon. For recommendations for which a recommended application was installed or used, the feedback 330 can include usage information for the acted-upon application so that the recommendation system 302 knows how much (if any) a recommended application is used after selection of a recommendation. In some implementations, the feedback 330 can be used by a machine learning engine 332 to tailor future recommendations.

In some implementations, the recommendation generator 320 can be configured to consider multiple types of pattern matches and to use various algorithms to determine which recommendations to generate. Algorithm outputs can be aggregated to determine final recommendations. In some implementations, each type of pattern match can have a corresponding weight, where weights for types of pattern matches or algorithms can be adjusted based on the received feedback 330.

For example, certain types of recommendations (such as, formats and channels) that are acted upon at a higher-frequency than other types of recommendations can be used more often than recommendation types that are acted upon less-frequently. As another example, if less than a certain predefined percentage of users accept a recommendation for a particular application, recommendations for that application can be reduced or eliminated in the future. As a specific example, if a less than two percent of users act upon a recommendation for a new email application, the machine learning engine 332 can send information to the recommendation generator 320 so that the email application is not recommended (or recommended even less frequently or only recommended based on particular criteria) in the future. Conversely, if recommendations for a new human resources application are accepted at a rate of 90%, the machine learning engine 332 can send information to the recommendation generator 320 so that the human resources application is recommended to more uses more often.

Other recommendation examples are described in following figures. The data mining component 318, the information retriever 311, the recommendation generator 320, or the machine learning engine 332 can use an algorithm library 334 for processing. For example, pattern-matching algorithms, machine-learning algorithms, or other mathematical algorithms can be accessed by recommendation system 302 components from the algorithm library 334.

Other types of outputs 336 can be produced by the recommendation system 302. For example, the recommendation system 302 can expose user information 314, application data 316, recommendations 322, and application-user matches 319 to privileged users, for analysis and understanding of user and application landscapes and recommendation history. In some implementations, stored recommendations 322 can include information on recommendation acceptance rates. Exposed information from the database 317 can be provided in report or data feed form (for analyst viewing or processing by system(s)).

The recommendation system 302 can analyze user behavior information to come up with insights that can identify application functionality that may be missing from the application landscape, and can generate recommendations for new application functionality (for example, to be presented to administrators or information technology personnel). For example, the recommendation computing system 302 can recognize a pattern application use that is common among users. For example, the recommendation computing system 302 can recognize that multiple users use a same set of consecutive features when interacting with sales orders (for example, a first action to record a sales order, a second action to update sales order attachments, and a third action to export the updated attachments to an email composition application). The recommendation computing system 302 can recognize this usage pattern and recommend new application functionality that combines the multiple actions into a single action that can be performed by the user using one action or one automated process, rather than multiple disparate actions.

Figure 4:
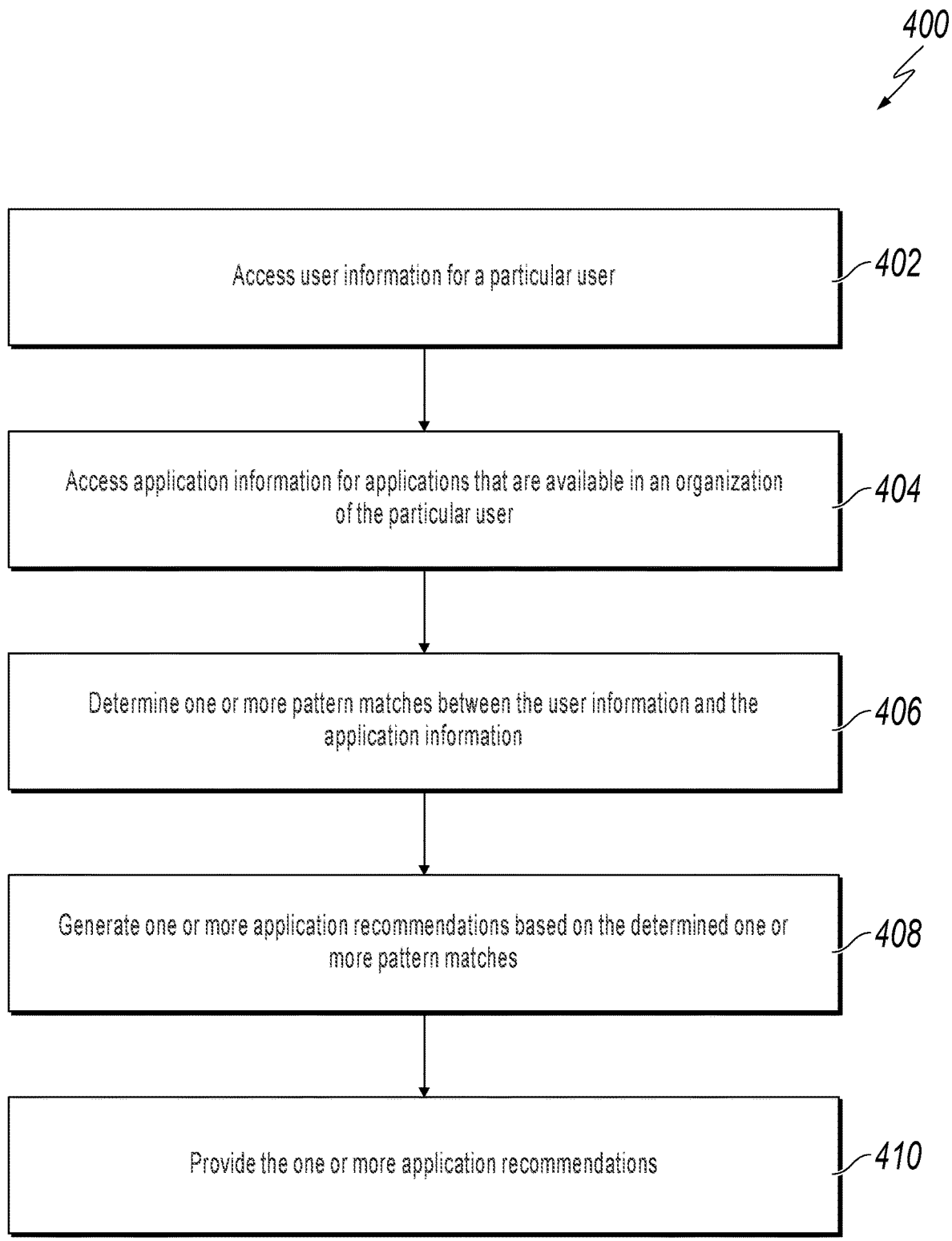
FIG. 4 is a flowchart illustrating an example of a computer-implemented method for real-time matching of users and applications, according to an implementation of the present disclosure.

FIG. 4 is a flowchart illustrating an example of a computer-implemented method 400 for real-time matching of users and applications, according to an implementation of the present disclosure. For clarity of presentation, the description that follows generally describes method 400 in the context of the other figures in this description. However, it will be understood that method 400 can be performed, for example, by any system, environment, software, and hardware, or a combination of systems, environments, software, and hardware, as appropriate. In some implementations, various steps of method 400 can be run in parallel, in combination, in loops, or in any order.

At 402, user information for a particular user is accessed. User information can include one or more of organizational data for the user, demographic data, application usage information, a user role for the user, user profile information, user activity data, user preferences, a current location of the user, or a current time at which a recommendation can be presented to the user From 402, method 400 proceeds to 404.

At 404, application information is accessed for applications that are available in an organization of the particular user. Application information can include one or more of an application category, an application description, application knowledge prerequisite information, application training prerequisite information, application cost, application functionality, or application permission requirements. From 404, method 400 proceeds to 406.

At 406, one or more pattern matches between the user information and the application information are determined. A pattern match can be a match between the user information and a predefined pattern relating to application data or a match between application information and a predefined pattern relating to user information. From 406, method 400 proceeds to 408.

Determining the one or more pattern matches can include determining an application to which the user has access, determining an application that matches historical application usage for the user, or determining an application that matches a role of the user, to name a few examples. As another example, determining the one or more pattern matches can include determining an application that matches some of the user information, with the user lacking knowledge or training to use the application, and an identification of the lacked knowledge or training and a determination of how to obtain the lacked knowledge or training.

At 408, one or more application recommendations are generated based on the determined one or more pattern matches. The one or more application recommendations can be generated in response to a trigger, such as a change in user information, a change in application information, or a start of a periodic interval at which to automatically process the user information and the application information. From 408, method 400 proceeds to 410.

At 410, the one or more application recommendations are provided. For example, application recommendation(s) can be presented to the user in a user interface. After 410, method 400 stops.

Figure 5:
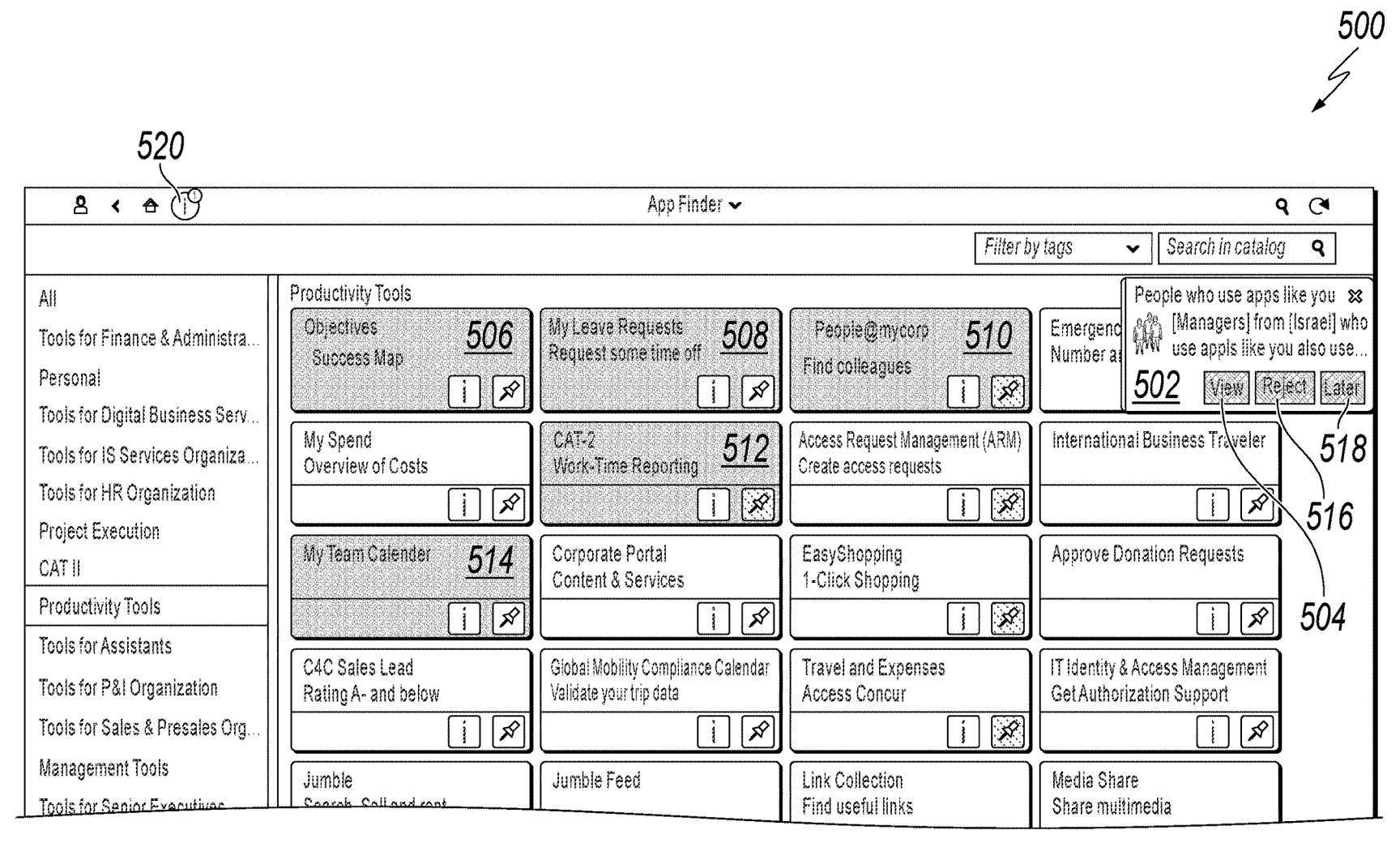

FIG. 5 is an example of a user interface 500 in which a generated application recommendation is presented. An organization has deployed, to the organization, a set of new applications for managers who are located in Israel. Despite other communications, some but not all Israeli managers have installed the new applications. A recommendation system can determine, for the Israeli managers who have not installed the new applications, that the new applications may be useful for those users based on a profile role of manager matching application target-role information, the users' location matching a target-location attribute of the applications, or based on the users' roles and location matching the Israeli managers who have installed the applications. The recommendation system can determine that the Israeli managers who have installed the applications are similar users to the Israeli managers who have not installed the applications. The recommendation system can identify the application usage of the new applications by the Israeli managers who have installed the new applications, and can generate a recommendation to be presented to other Israeli managers, who have not installed the applications, that the new applications may be useful. As another example, the recommendation can be presented to a user whose role (due to hiring or role or location change) matches that of an Israeli manager.

For example, a recommendation 502 can be presented in the user interface 500 (for example, an application finder user interface). The user can select a view user interface control 504 to view more details about the recommendation 502. For example, in response to selection of the view user interface control 504, recommended application representations 506, 508, 510, 512, and 514 can be presented and highlighted in the user interface 500. The highlighted user interface representations indicate to the user the applications that correspond to a message "[Managers] from [Israel] who use apps like use also use . . . " included in the recommendation 502. The user can select one or more of the recommended application representations 506, 508, 510, 512, and 514 to install, use, or view more detail about recommended application(s).

The user can select a reject user interface control 516 to dismiss the recommendation 502. A "later" user interface control 518 can be selected to temporarily dismiss the recommendation 502 (so that the recommendation 502 can be re-displayed at a later time). An indicator 520 can be presented as another indication (in addition to presentation of the recommendation 502) that an application recommendation is available for the user.

Figure 6:
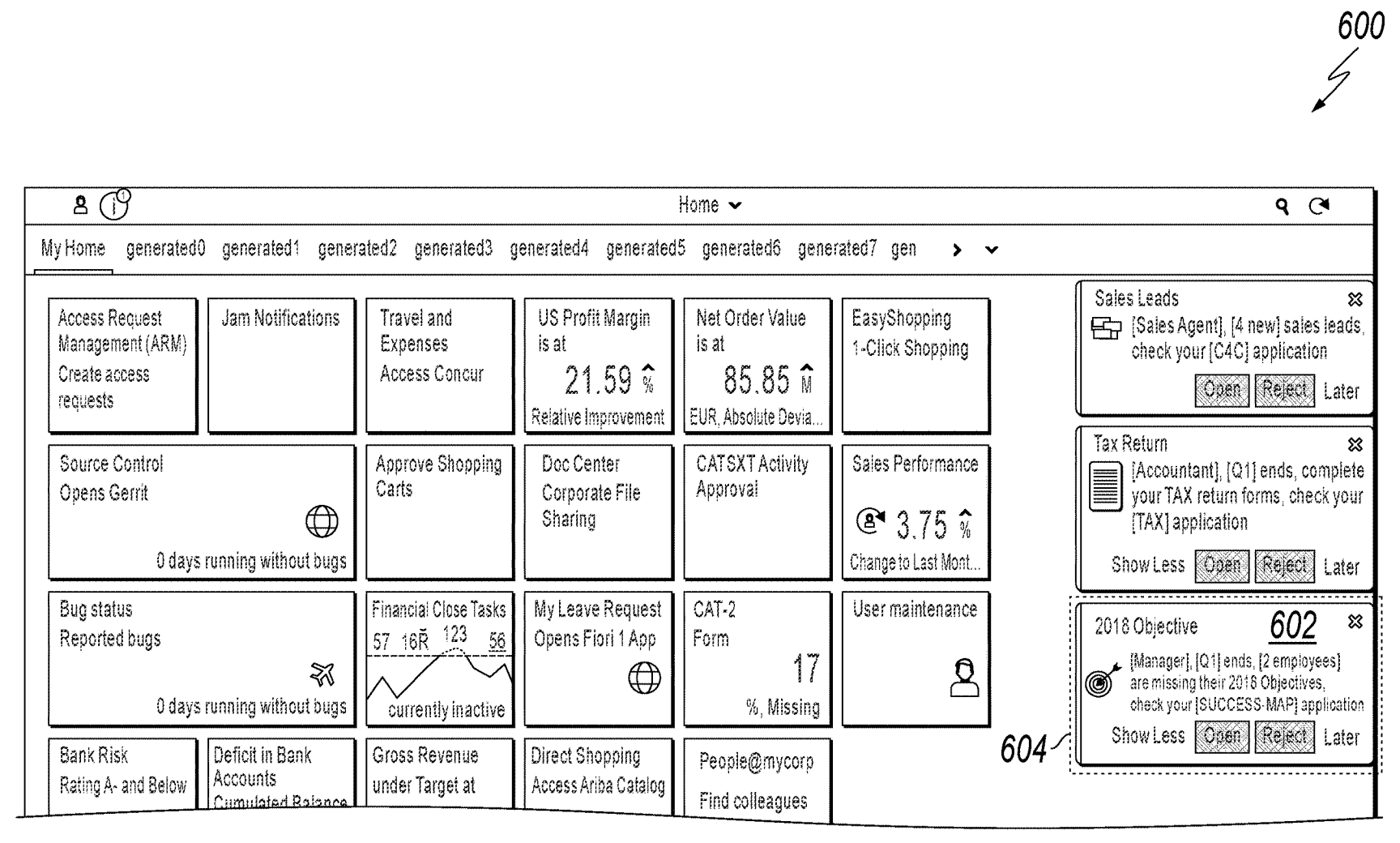

FIG. 6 is an example of a user interface 600 in which a generated application recommendation is presented. An organization can deploy, in the organization, a human resources application which can be used by employees to establish a set of annual goals. An organizational policy can be that employees are to establish annual goals by the end of the first quarter. A recommendation system can determine, from user, organizational, and contextual data, that a particular user has a role of manager, that some of the manager's subordinates have not established employee goals, and that a current date is after the end of the first quarter deadline. The recommendation system can determine that the human resources application can be used by employees to establish employee goals and clear the uncompleted tasks of setting goals.

The recommendation system can generate an employee recommendation recommending that employees who have not yet established goals use the human resources application to set their goals. The recommendation system can include, in the employee recommendation, a link to the human resources application. The recommendation system can also generate a manager recommendation 602, to be provided to the manager of the employees. The manager recommendation 602 can communicate to the manager that subordinates have not established their goals, and to suggest that the manager open the human resources application to check for further details. The manager can select an open user interface control 604 to view more details about the manager recommendation 602. Additional details can include a link to the human resources application, for the manager, and an option to send the employee recommendation to the relevant employees (either immediately or scheduled, such as before a next scheduled meeting with each employee). The employee recommendation can be presented to employees as an email or as a notification, on employee user interfaces, that is similar to the recommendation 602. Respective employee recommendations can be generated and presented to employees, by the recommendation system, irrespective of whether the manager decides to send reminder recommendations using the manager recommendation 602.

Figure 7:
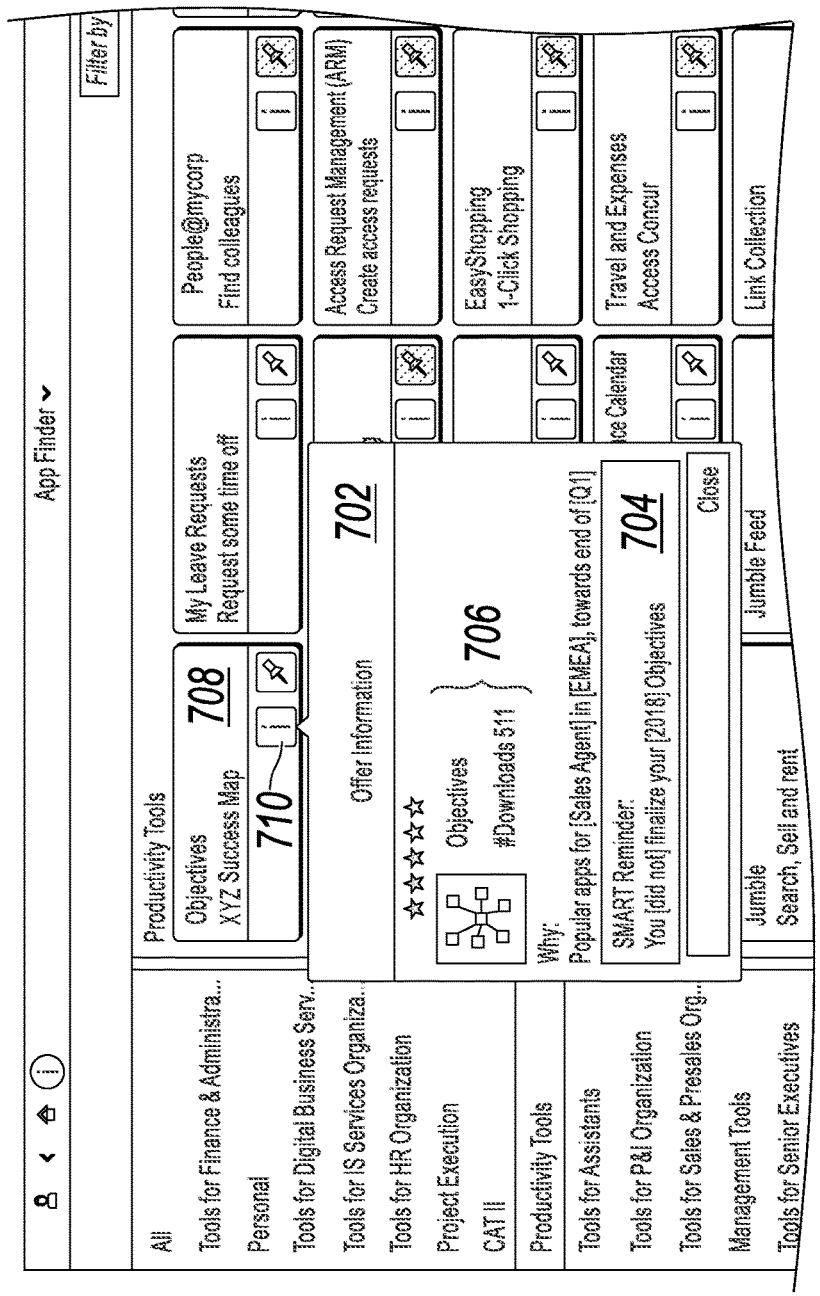

FIG. 7 is an example of a user interface 700 in which a generated application recommendation is presented. For the previous example of employees not establishing annual goals, a recommendation 702 can be presented to an employee who has not set goals for the year. The recommendation 702 can be presented in response to a manager electing to remind employees, or as a direct recommendation from a recommendation system. The recommendation system can determine, for example, that the employee has not yet set goals, and a current date is past (or approaching) a deadline. The recommendation 702 can include a reason 704 for why the recommendation 702 is being displayed, and information 706 about an application that can be used to complete the goal-setting task. The recommendation application can be selected, for example, based on a role of the user (for example, sales agent) and application functionality (for example, goal setting) provided by the recommended application. An application representation 708 can be highlighted in the user interface 700 in conjunction with the presentation of the recommendation 702. In some implementations, the recommendation 702 can be closed, reopened, or initially displayed by selecting information user interface control 710 on the application representation 708.

Figure 8:
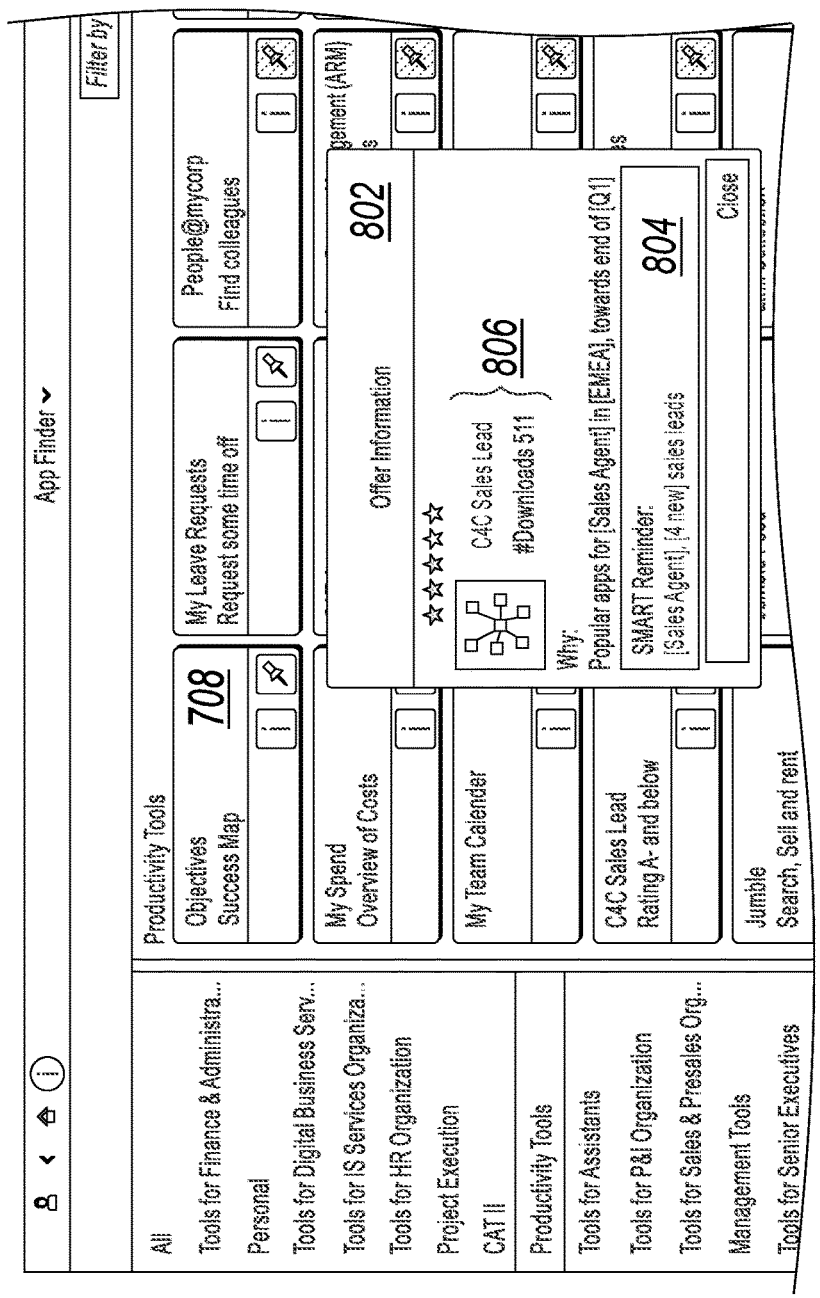

FIG. 8 is an example user interface in which a generated application recommendation is presented. A recommendation 802 has been presented to a sales agent regarding using a sales lead application to handle new sales leads. A recommendation system can determine that four new leads exist that have been assigned to the sales agent and that a status of the leads has been "New" for over seventy two hours. The recommendation system can determine when to present the recommendation 802 to the sales agent. For example, the recommendation system can schedule presentation for when the sales agent is next at a sales office and has free time listed in a calendar application. The recommendation system can interface with the user interface 800, or with other network applications or systems, to present the recommendation 802 when the user next logs in at the sales office, when the user next launches a dashboard application, or uses an application finder application such as the user interface 800. The recommendation 802 includes a reason 804 for presentation of the recommendation 802 and information 806 for the recommended application.

Figure 9:
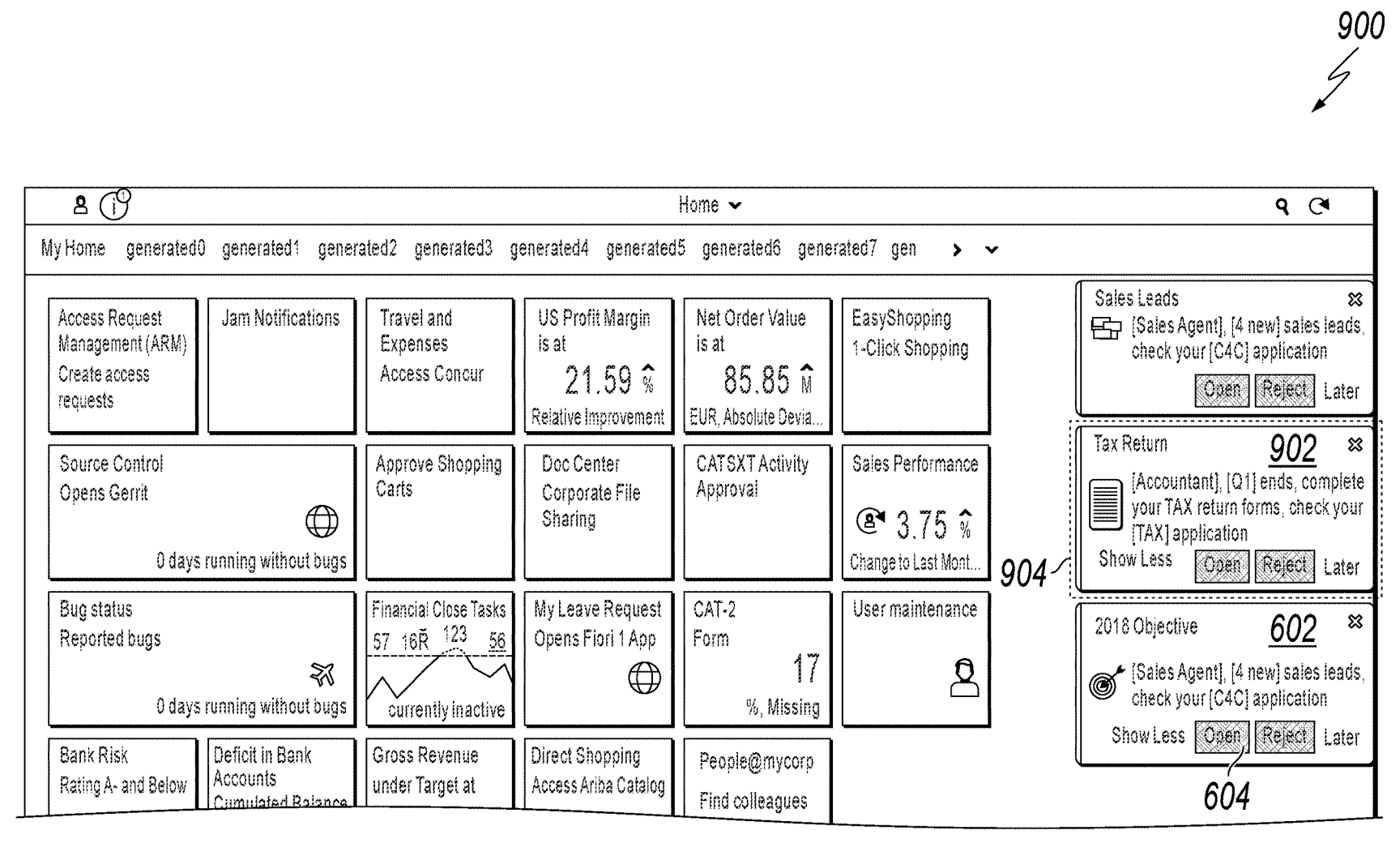

FIG. 9 is an example user interface in which a generated application recommendation is presented. A recommendation system can determine that a particular employee has a role of accountant, that certain tasks relating to the role of accountant, such as completion of tax returns, have not been completed, and that a current date is approaching a deadline for the uncompleted tasks. A recommendation 902 can be displayed, that includes a reason (uncompleted tax returns) for why the recommendation 902 is being displayed, and a suggestion to open a tax application to complete the uncompleted tasks. The recommendation application can be selected, for example, based on a role of the user (accountant) and application functionality (tax return completion) provided by the recommended tax application. The user can select an open user interface control 904 that can either open the tax application or open a detailed recommendation that includes more information than the recommendation 902 (including a link or other mechanism to open the recommended tax application).

Figure 10:
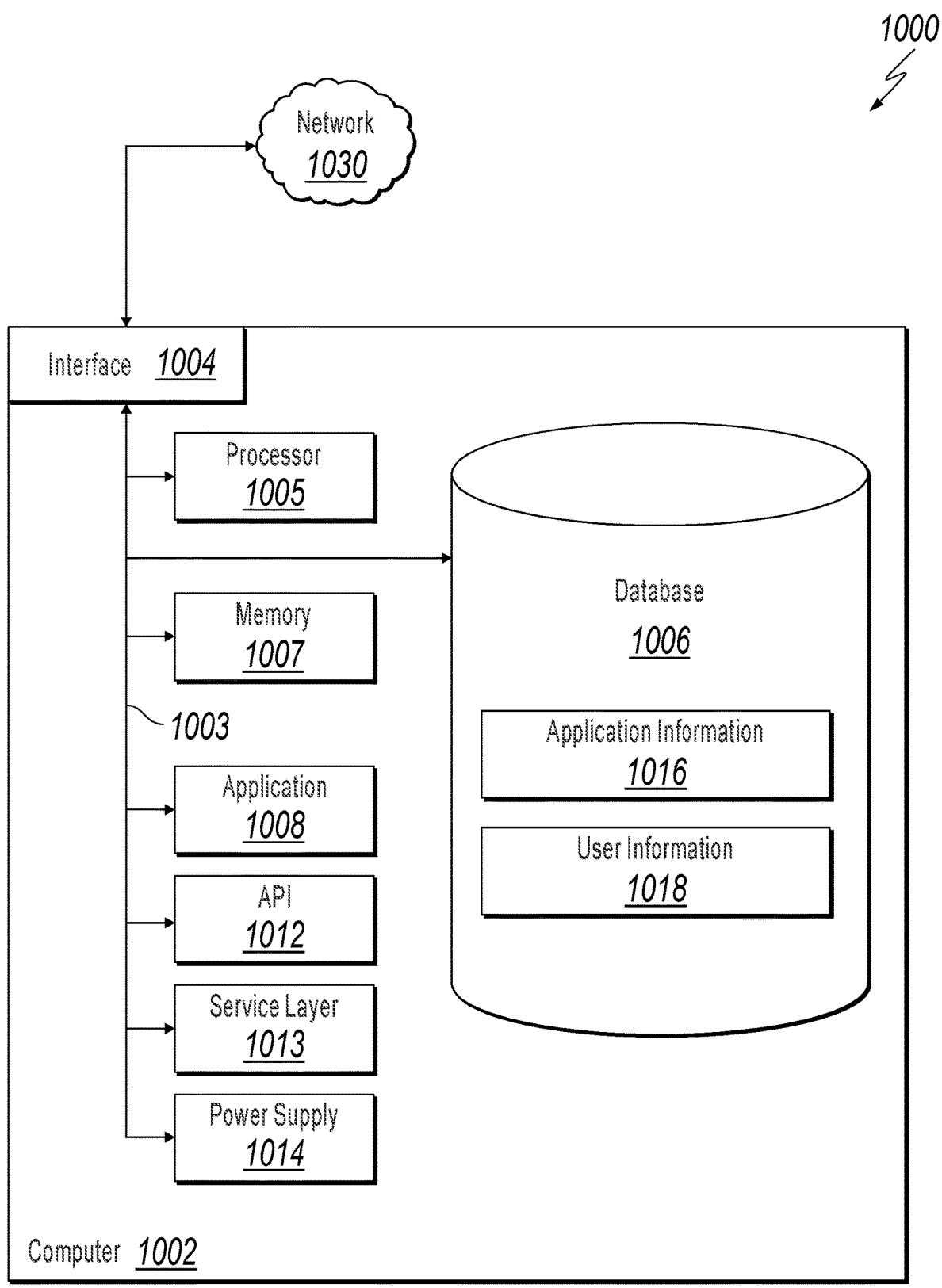
FIG. 10 is a block diagram illustrating an example of a computer-implemented system used to provide computational functionalities associated with described algorithms, methods, functions, processes, flows, and procedures, according to an implementation of the present disclosure.

FIG. 10 is a block diagram illustrating an example of a computer-implemented System 1000 used to provide computational functionalities associated with described algorithms, methods, functions, processes, flows, and procedures, according to an implementation of the present disclosure. In the illustrated implementation, System 1000 includes a Computer 1002 and a Network 1030.

The illustrated Computer 1002 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the Computer 1002 can include an input device, such as a keypad, keyboard, or touch screen, or a combination of input devices that can accept user information, and an output device that conveys information associated with the operation of the Computer 1002, including digital data, visual, audio, another type of information, or a combination of types of information, on a graphical-type user interface (UI) (or GUI) or other UI.

The Computer 1002 can serve in a role in a distributed computing system as, for example, a client, network component, a server, or a database or another persistency, or a combination of roles for performing the subject matter described in the present disclosure. The illustrated Computer 1002 is communicably coupled with a Network 1030. In some implementations, one or more components of the Computer 1002 can be configured to operate within an environment, or a combination of environments, including cloud-computing, local, or global.

At a high level, the Computer 1002 is an electronic computing device operable to receive, transmit, process, store, or manage data and information associated with the described subject matter. According to some implementations, the Computer 1002 can also include or be communicably coupled with a server, such as an application server, e-mail server, web server, caching server, or streaming data server, or a combination of servers.

The Computer 1002 can receive requests over Network 1030 (for example, from a client software application executing on another Computer 1002) and respond to the received requests by processing the received requests using a software application or a combination of software applications. In addition, requests can also be sent to the Computer 1002 from internal users (for example, from a command console or by another internal access method), external or third-parties, or other entities, individuals, systems, or computers.

Each of the components of the Computer 1002 can communicate using a System Bus 1003. In some implementations, any or all of the components of the Computer 1002, including hardware, software, or a combination of hardware and software, can interface over the System Bus 1003 using an application programming interface (API) 1012, a Service Layer 1013, or a combination of the API 1012 and Service Layer 1013. The API 1012 can include specifications for routines, data structures, and object classes. The API 1012 can be either computer-language independent or dependent and refer to a complete interface, a single function, or even a set of APIs. The Service Layer 1013 provides software services to the Computer 1002 or other components (whether illustrated or not) that are communicably coupled to the Computer 1002. The functionality of the Computer 1002 can be accessible for all service consumers using the Service Layer 1013. Software services, such as those provided by the Service Layer 1013, provide reusable, defined functionalities through a defined interface. For example, the interface can be software written in a computing language (for example JAVA or C++) or a combination of computing languages, and providing data in a particular format (for example, extensible markup language (XML)) or a combination of formats. While illustrated as an integrated component of the Computer 1002, alternative implementations can illustrate the API 1012 or the Service Layer 1013 as stand-alone components in relation to other components of the Computer 1002 or other components (whether illustrated or not) that are communicably coupled to the Computer 1002. Moreover, any or all parts of the API 1012 or the Service Layer 1013 can be implemented as a child or a sub-module of another software module, enterprise application, or hardware module without departing from the scope of the present disclosure.

The Computer 1002 includes an Interface 1004. Although illustrated as a single Interface 1004, two or more Interfaces 1004 can be used according to particular needs, desires, or particular implementations of the Computer 1002. The Interface 1004 is used by the Computer 1002 for communicating with another computing system (whether illustrated or not) that is communicatively linked to the Network 1030 in a distributed environment. Generally, the Interface 1004 is operable to communicate with the Network 1030 and includes logic encoded in software, hardware, or a combination of software and hardware. More specifically, the Interface 1004 can include software supporting one or more communication protocols associated with communications such that the Network 1030 or hardware of Interface 1004 is operable to communicate physical signals within and outside of the illustrated Computer 1002.

The Computer 1002 includes a Processor 1005. Although illustrated as a single Processor 1005, two or more Processors 1005 can be used according to particular needs, desires, or particular implementations of the Computer 1002. Generally, the Processor 1005 executes instructions and manipulates data to perform the operations of the Computer 1002 and any algorithms, methods, functions, processes, flows, and procedures as described in the present disclosure.

The Computer 1002 also includes a Database 1006 that can hold data for the Computer 1002, another component communicatively linked to the Network 1030 (whether illustrated or not), or a combination of the Computer 1002 and another component. For example, Database 1006 can be an in-memory or conventional database storing data consistent with the present disclosure. In some implementations, Database 1006 can be a combination of two or more different database types (for example, a hybrid in-memory and conventional database) according to particular needs, desires, or particular implementations of the Computer 1002 and the described functionality. Although illustrated as a single Database 1006, two or more databases of similar or differing types can be used according to particular needs, desires, or particular implementations of the Computer 1002 and the described functionality. While Database 1006 is illustrated as an integral component of the Computer 1002, in alternative implementations, Database 1006 can be external to the Computer 1002. As illustrated, the Database 1006 holds the previously described application information 1016 and user information 1018.

The Computer 1002 also includes a Memory 1007 that can hold data for the Computer 1002, another component or components communicatively linked to the Network 1030 (whether illustrated or not), or a combination of the Computer 1002 and another component. Memory 1007 can store any data consistent with the present disclosure. In some implementations, Memory 1007 can be a combination of two or more different types of memory (for example, a combination of semiconductor and magnetic storage) according to particular needs, desires, or particular implementations of the Computer 1002 and the described functionality. Although illustrated as a single Memory 1007, two or more Memories 1007 or similar or differing types can be used according to particular needs, desires, or particular implementations of the Computer 1002 and the described functionality. While Memory 1007 is illustrated as an integral component of the Computer 1002, in alternative implementations, Memory 1007 can be external to the Computer 1002.

The Application 1008 is an algorithmic software engine providing functionality according to particular needs, desires, or particular implementations of the Computer 1002, particularly with respect to functionality described in the present disclosure. For example, Application 1008 can serve as one or more components, modules, or applications. Further, although illustrated as a single Application 1008, the Application 1008 can be implemented as multiple Applications 1008 on the Computer 1002. In addition, although illustrated as integral to the Computer 1002, in alternative implementations, the Application 1008 can be external to the Computer 1002.

The Computer 1002 can also include a Power Supply 1014. The Power Supply 1014 can include a rechargeable or non-rechargeable battery that can be configured to be either user- or non-user-replaceable. In some implementations, the Power Supply 1014 can include power-conversion or management circuits (including recharging, standby, or another power management functionality). In some implementations, the Power Supply 1014 can include a power plug to allow the Computer 1002 to be plugged into a wall socket or another power source to, for example, power the Computer 1002 or recharge a rechargeable battery.

There can be any number of Computers 1002 associated with, or external to, a computer system containing Computer 1002, each Computer 1002 communicating over Network 1030. Further, the term "client," "user," or other appropriate terminology can be used interchangeably, as appropriate, without departing from the scope of the present disclosure. Moreover, the present disclosure contemplates that many users can use one Computer 1002, or that one user can use multiple computers 1002.

Described implementations of the subject matter can include one or more features, alone or in combination. For example, in a first implementation, a computer-implemented method comprises: accessing user information for a particular user; accessing application information for applications that are available in an organization of the particular user; determining one or more pattern matches between the user information and the application information; generating one or more application recommendations based on the determined one or more pattern matches; and providing the one or more application recommendations.

The foregoing and other described implementations can each, optionally, include one or more of the following features:

A first feature, combinable with any of the following features, wherein the user information includes one or more of organizational data for the user, demographic data, application usage information, a user role for the user, user profile information, user activity data, user preferences, a current location of the user, or a current time at which a recommendation can be presented to the user.

A second feature, combinable with any of the previous or following features, wherein the application information includes one or more of an application category, an application description, application knowledge prerequisite information, application training prerequisite information, application cost, application functionality, or application permission requirements.

A third feature, combinable with any of the previous or following features, wherein at least one pattern match is a match between the user information and a predefined pattern relating to application data.

A fourth feature, combinable with any of the previous or following features, wherein at least one pattern match is a match between application information and a predefined pattern relating to user information.

A fifth feature, combinable with any of the previous or following features, wherein the one or more application recommendations are generated in response to a trigger.

A sixth feature, combinable with any of the previous or following features, wherein the trigger comprises one of a change in user information, a change in application information, or a start of a periodic interval at which to automatically process the user information and the application information.

A seventh feature, combinable with any of the previous or following features, further comprising storing the one or more pattern matches.

An eighth feature, combinable with any of the previous or following features, further comprising: receiving feedback related to one or more provided application recommendations; and adjusting a pattern recognition engine to improve generation of future application recommendations.

A ninth feature, combinable with any of the previous or following features, wherein determining one or more pattern matches comprises determining an application to which the user has access.

A tenth feature, combinable with any of the previous or following features, wherein determining one or more pattern matches comprises determining an application that matches historical application usage for the user.

An eleventh feature, combinable with any of the previous or following features, wherein determining one or more pattern matches comprises determining an application that matches a role of the user.

A twelfth feature, combinable with any of the previous or following features, wherein determining one or more pattern matches comprises determining an application that matches some of the user information, wherein the user lacks knowledge or training to use the application, the method further comprising determining the knowledge or training needed and including a suggestion that the user obtain the needed knowledge or training in a provided application recommendation.

A thirteenth feature, combinable with any of the previous or following features, further comprising assessing a payment for the one or more application recommendations if a particular application recommendation of the one or more application recommendations is followed by a user.

In a second implementation, a non-transitory, computer-readable medium stores one or more instructions executable by a computer system to perform operations comprising: accessing user information for a particular user; accessing application information for applications that are available in an organization of the particular user; determining one or more pattern matches between the user information and the application information; generating one or more application recommendations based on the determined one or more pattern matches; and providing the one or more application recommendations.

The foregoing and other described implementations can each, optionally, include one or more of the following features:

A first feature, combinable with any of the following features, wherein the user information includes one or more of organizational data for the user, demographic data, application usage information, a user role for the user, user profile information, user activity data, user preferences, a current location of the user, or a current time at which a recommendation can be presented to the user.

A second feature, combinable with any of the previous or following features, wherein the application information includes one or more of an application category, an application description, application knowledge prerequisite information, application training prerequisite information, application cost, application functionality, or application permission requirements.

A third feature, combinable with any of the previous or following features, wherein at least one pattern match is a match between the user information and a predefined pattern relating to application data.

A fourth feature, combinable with any of the previous or following features, wherein at least one pattern match is a match between application information and a predefined pattern relating to user information.

A fifth feature, combinable with any of the previous or following features, wherein the one or more application recommendations are generated in response to a trigger.

A sixth feature, combinable with any of the previous or following features, wherein the trigger comprises one of a change in user information, a change in application information, or a start of a periodic interval at which to automatically process the user information and the application information.

A seventh feature, combinable with any of the previous or following features, further comprising storing the one or more pattern matches.

An eighth feature, combinable with any of the previous or following features, further comprising: receiving feedback related to one or more provided application recommendations; and adjusting a pattern recognition engine to improve generation of future application recommendations.

A ninth feature, combinable with any of the previous or following features, wherein determining one or more pattern matches comprises determining an application to which the user has access.

A tenth feature, combinable with any of the previous or following features, wherein determining one or more pattern matches comprises determining an application that matches historical application usage for the user.

An eleventh feature, combinable with any of the previous or following features, wherein determining one or more pattern matches comprises determining an application that matches a role of the user.

A twelfth feature, combinable with any of the previous or following features, wherein determining one or more pattern matches comprises determining an application that matches some of the user information, wherein the user lacks knowledge or training to use the application, the method further comprising determining the knowledge or training needed and including a suggestion that the user obtain the needed knowledge or training in a provided application recommendation.

A thirteenth feature, combinable with any of the previous or following features, further comprising assessing a payment for the one or more application recommendations if a particular application recommendation of the one or more application recommendations is followed by a user.

In a third implementation, a computer-implemented system, comprises one or more computers and one or more computer memory devices interoperably coupled with the one or more computers and having tangible, non-transitory, machine-readable media storing one or more instructions that, when executed by the one or more computers, perform one or more operations comprising: accessing user information for a particular user; accessing application information for applications that are available in an organization of the particular user; determining one or more pattern matches between the user information and the application information; generating one or more application recommendations based on the determined one or more pattern matches; and providing the one or more application recommendations.

The foregoing and other described implementations can each, optionally, include one or more of the following features:

A first feature, combinable with any of the following features, wherein the user information includes one or more of organizational data for the user, demographic data, application usage information, a user role for the user, user profile information, user activity data, user preferences, a current location of the user, or a current time at which a recommendation can be presented to the user.

A second feature, combinable with any of the previous or following features, wherein the application information includes one or more of an application category, an application description, application knowledge prerequisite information, application training prerequisite information, application cost, application functionality, or application permission requirements.

A third feature, combinable with any of the previous or following features, wherein at least one pattern match is a match between the user information and a predefined pattern relating to application data.

A fourth feature, combinable with any of the previous or following features, wherein at least one pattern match is a match between application information and a predefined pattern relating to user information.

A fifth feature, combinable with any of the previous or following features, wherein the one or more application recommendations are generated in response to a trigger.

A sixth feature, combinable with any of the previous or following features, wherein the trigger comprises one of a change in user information, a change in application information, or a start of a periodic interval at which to automatically process the user information and the application information.

A seventh feature, combinable with any of the previous or following features, further comprising storing the one or more pattern matches.

An eighth feature, combinable with any of the previous or following features, further comprising: receiving feedback related to one or more provided application recommendations; and adjusting a pattern recognition engine to improve generation of future application recommendations.

A ninth feature, combinable with any of the previous or following features, wherein determining one or more pattern matches comprises determining an application to which the user has access.

A tenth feature, combinable with any of the previous or following features, wherein determining one or more pattern matches comprises determining an application that matches historical application usage for the user.

An eleventh feature, combinable with any of the previous or following features, wherein determining one or more pattern matches comprises determining an application that matches a role of the user.

A twelfth feature, combinable with any of the previous or following features, wherein determining one or more pattern matches comprises determining an application that matches some of the user information, wherein the user lacks knowledge or training to use the application, the method further comprising determining the knowledge or training needed and including a suggestion that the user obtain the needed knowledge or training in a provided application recommendation.

A thirteenth feature, combinable with any of the previous or following features, further comprising assessing a payment for the one or more application recommendations if a particular application recommendation of the one or more application recommendations is followed by a user.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/–R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   accessing organizational user information for a particular user, wherein the organizational user information corresponds to a role of the particular user in an organization of the particular user and uncompleted tasks that the user has been assigned to complete within the organization;
   accessing contextual information for the particular user, including location information indicating a site of the organization at which the particular user is currently located;
   accessing application information for applications that are available in the organization, wherein the application information includes information regarding applications that can be used to complete the uncompleted tasks and that are available at the site of the organization at which the user is currently located;
   determining one or more pattern matches between the user information and the application information, including determining one or more applications that can be used to complete the uncompleted tasks at the site at which the user is currently located;
   generating one or more application recommendations based on the determined one or more pattern matches for performing organizational role-based tasks by the user in the role at the site at which the user is currently located; and
   providing the one or more application recommendations.

2. The computer-implemented method of claim 1, wherein the organizational user information includes one or more of demographic data for the user stored by the organization, application usage information by the user when in the role, relationship information describing relationships of the user to other users within the organization user profile information, user activity data for the user using one or more organizational systems, user preferences, a current location of the user, or a current time at which a recommendation can be presented to the user.

3. The computer-implemented method of claim 1, wherein the application information includes one or more of an application category, an application description, application knowledge prerequisite information, application training prerequisite information, application cost, application functionality, or application permission requirements.

4. The computer-implemented method of claim 1, wherein at least one pattern match is a match between the organizational user information and a predefined pattern relating to application data.

5. The computer-implemented method of claim 1, wherein at least one pattern match is a match between application information and a predefined pattern relating to organizational user information.

6. The computer-implemented method of claim 1, wherein the one or more application recommendations are generated in response to a trigger.

7. The computer-implemented method of claim 6, wherein the trigger comprises one of a change in organizational user information, a change in application information, or a start of a periodic interval at which to automatically process the organizational user information and the application information.

8. The computer-implemented method of claim 1, further comprising storing the one or more pattern matches.

9. The computer-implemented method of claim 1, further comprising:
receiving feedback related to one or more provided application recommendations; and
adjusting a pattern recognition engine to improve generation of future application recommendations.

10. The computer-implemented method of claim 1, wherein determining one or more pattern matches comprises determining an application to which the user has access.

11. The computer-implemented method of claim 1, wherein determining one or more pattern matches comprises determining an application that matches historical application usage for the user.

12. The computer-implemented method of claim 1, wherein determining one or more pattern matches comprises determining an application that matches some of the organizational user information, wherein the user lacks knowledge or training to use the application, the method further comprising determining the knowledge or training needed and including a suggestion that the user obtain the needed knowledge or training in a provided application recommendation.

13. The computer-implemented method of claim 1, further comprising assessing a payment for the one or more application recommendations if a particular application recommendation of the one or more application recommendations is followed by a user.

14. A non-transitory, computer-readable medium storing one or more instructions executable by a computer system to perform operations comprising:
accessing organizational user information for a particular user, wherein the organizational user information corresponds to a role of the particular user in an organization of the particular user and uncompleted tasks that the user has been assigned to complete within the organization;
accessing contextual information for the particular user, including location information indicating a site of the organization at which the particular user is currently located;
accessing application information for applications that are available in the organization, wherein the application information includes information regarding applications that can be used to complete the uncompleted tasks and that are available at the site of the organization at which the user is currently located;
determining one or more pattern matches between the user information and the application information, including determining one or more applications that can be used to complete the uncompleted tasks at the site at which the user is currently located;
generating one or more application recommendations based on the determined one or more pattern matches for performing organizational role-based tasks by the user in the role at the site at which the user is currently located; and
providing the one or more application recommendations.

15. The non-transitory, computer-readable medium of claim 14, wherein the organizational user information includes one or more of demographic data for the user stored by the organization, application usage information by the user when in the role, relationship information describing relationships of the user to other users within the organization user profile information, user activity data for the user using one or more organizational systems, user preferences, a current location of the user, or a current time at which a recommendation can be presented to the user.

16. The non-transitory, computer-readable medium of claim 14, wherein the application information includes one or more of an application category, an application description, application knowledge prerequisite information, application training prerequisite information, application cost, application functionality, or application permission requirements.

17. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
accessing organizational user information for a particular user, wherein the organizational user information corresponds to a role of the particular user in an organization of the particular user and uncompleted tasks that the user has been assigned to complete within the organization;
accessing contextual information for the particular user, including location information indicating a site of the organization at which the particular user is currently located;
accessing application information for applications that are available in the organization, wherein the application information includes information regarding applications that can be used to complete the uncompleted tasks and that are available at the site of the organization at which the user is currently located;
determining one or more pattern matches between the user information and the application information, including determining one or more applications that can be used to complete the uncompleted tasks at the site at which the user is currently located;
generating one or more application recommendations based on the determined one or more pattern matches for performing organizational role-based tasks by the user in the role at the site at which the user is currently located; and
providing the one or more application recommendations.

18. The computer-implemented system of claim 17, wherein the organizational user information includes one or more of demographic data for the user stored by the organization, application usage information by the user when in the role, relationship information describing relationships of the user to other users within the organization user profile information, user activity data for the user using one or more organizational systems, user preferences, a current location of the user, or a current time at which a recommendation can be presented to the user.

19. The computer-implemented system of claim 17, wherein the application information includes one or more of an application category, an application description, application knowledge prerequisite information, application training prerequisite information, application cost, application functionality, or application permission requirements.

\* \* \* \* \*